United States Patent Office 2,813,598
Patented Nov. 19, 1957

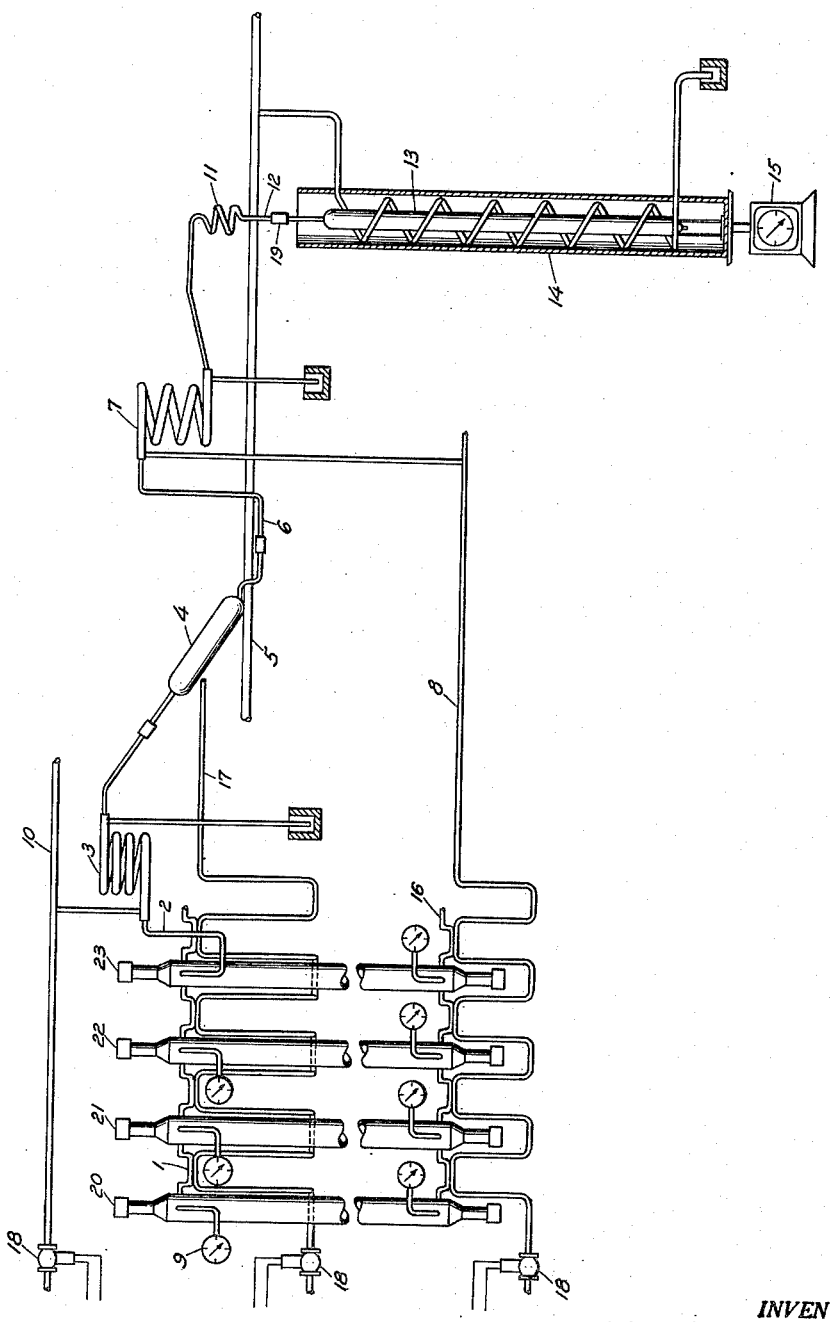

2,813,598

METHOD FOR REMOVAL OF LIGHT ISOTOPE PRODUCT FROM LIQUID THERMAL DIFFUSION UNITS

John D. Hoffman, Chevy Chase, Md., and James K. Ballou, Lakeside, Calif., assignors to the United States of America as represented by the United States Atomic Energy Commission Application November 15, 1945, Serial No. 628,918

5 Claims. (Cl. 183—115)

This invention relates to a withdrawal system for removing product from a liquid thermal diffusion apparatus. More particularly, this invention deals with an apparatus and method for removal of light isotope product collectively and simultaneously from a number of diffusion columns in two stages by the use of freeze valves.

In recent years, a growing interest has been manifest in the separation of liquefied gases of different molecular species, i. e. different molecular weights including isotopes. Successful separation of the above-mentioned gases in liquid media has been performed by means of a liquid thermal diffusion apparatus.

The subject matter of thermal diffusion is discussed in "Atomic Energy for Military Purposes," by H. D. Smyth. While our invention may be used with the process as therein described, it is not to be construed as limited to said process or any particular form of thermal diffusion apparatus.

In order to present a clearer conception of our invention it may be stated that a liquid thermal diffusion apparatus may comprise a plurality of diffusion columns operating in parallel; that is, each column operating as an individual unit, independently of the other columns.

Generally, a diffusion column comprises an inner tube, or hot wall, through which passes a heating medium, for example, saturated steam under high pressure, an outer tube, or cold wall, concentric to and at a predetermined spacing from the inner tube, around which is circulated a coolant, for example, water at a temperature above the melting point of the process material, the entire assembly being encased in a pipe and mounted vertically in a rack.

In the case in question, the diffusion plant consists of racks of columns, each rack containing more than 100 columns.

Process material containing, for example, two or more isotopes, such as $UF_6$, or any compound having suitable physical constants and characteristics, is introduced in the liquid phase at the bottom of the columns into the annular space between the outer and inner tubes and maintained at a relatively high pressure, for example 1700 p. s. i. The resulting diffusion brings about a concentration of the heavier isotope near the cold wall and the lighter isotope near the hot wall. Due to thermal convection, the flow of liquid, rich in heavier isotope, moves downward near the cold wall and the liquid, rich in the lighter isotope, flows upward near the hot wall. This flow results in concentration of the heavier isotope at the bottom and of the lighter isotope at the upper end of the column. The column is then tapped at the top and the light product removed from between the upper portion of said walls. The heavy product at the bottom of the column may be taken off and recycled.

Prior to this invention, the method used for removing the product from liquid thermal diffusion apparatus consisted of tapping the top of the individual columns and withdrawing product therefrom into a container by alternately freezing and thawing the outlet. This procedure was tedious, in view of the large number of columns being operated simultaneously, and required a large number of operators. An additional problem was presented in that the handling of highly corrosive media was hazardous to the safety of the operators.

We have found a new method of accomplishing the withdrawal of product from liquid thermal diffusion apparatus by means of which the problems set forth above are substantially eliminated.

This invention has for one object, to provide a system for removing the light product from a liquid thermal diffusion apparatus.

It is a further object of this invention to provide a means for removing product from a number of liquid thermal diffusion columns collectively and simultaneously.

It is still another object of this invention to remove product from liquid thermal diffusion columns by an apparatus and method which avoids a severe pressure drop within the columns which would produce a condition known as "pitching," or extreme convectional turbulence within the columns, said condition being known to be detrimental to the diffusion product.

Other objects will be in part obvious and in part hereinafter pointed out in connection with the following analysis of the invention.

The condition herein referred to as "pitching" may be defined as a state of the column in which a tremendous gain in steam consumption is experienced by the column due to an increase in heat transfer through the inner hot wall. Associated with the resulting condensation of steam in the column is a "hammering" noise which is often heard, for example, in a steam heating system when steam condenses in a cold radiator. The effect of the described condition on the diffusion process is a loss of equilibrium of the columns due to a turbulent viscous flow of material within the annular space of the columns, whereas a convectional flow is desired. Further meaning of the term will be apparent from the description which follows.

In order to present a clearer understanding of the present invention, it may be pointed out that each rack of 100 or more columns is divided into several sections, each section consisting of approximately 25 or more columns. By removing the product from a section of a plurality of columns collectively and simultaneously the number of product removal operations is reduced from over 100 to approximately, for example, 4 per rack. Since approximately 5 product removal operations are required per column per day, it is apparent that the present invention reduces the number of individual operations tremendously.

In addition to reducing the number of operators, the limited number of operations are performed in such a manner that there is a minimum exposure of the operators to the highly corrosive gas.

This invention may be more readily understood by reference to the accompanying drawing which is a more or less diagrammatic representation of an apparatus which is a part of this invention.

Referring to the drawing, the diffusion columns 20, 21, 22 and 23 are arranged vertically in parallel-spaced relationship and are connected at their bottoms by conduit 16, hereafter referred to as a monorail. The columns are connected at their tops by monorail 1 and have a common outlet 2, which may be located in the center of a section of columns. Common outlet 2 is connected to container 4 by means of restrictor-freezer coil 3 which is encased in a jacket, for example, copper tubing.

Container 4, hereinafter referred to as a capsule, is connected to main receiver 13 by means of conduit 6, freezer coil 7, helix 11, tie-in line 12 and compression fitting 19. Main receiver 13 is encased in a heated duct 14, and is positioned on a weighing scale 15, helix 11 permitting a tension-free scale reading. Line 5 represents a steam line and lines 8, 10 and 17 are water-air lines in which the flow is controlled by solenoid valves 18 of the conventional type. Pressure drop during product removal is indicated on gauge 9.

The operation of the above-described modification of our invention will become apparent to one skilled in the art by reference to the following examples:

*Example I*

Particularly advantageous results are obtained with our invention by a method of operation comprising the freezing of bottom monorail 16 by means of water being caused to flow through water-air line 8 at a temperature below the freezing point of the product, unfreezing top monorail 1 by purging the water from line 17 with air, and unfreezing the restrictor-freezer coil 3 by purging the water from line 10 with air. Sufficient heat is absorbed from the surrounding duct work to unfreeze product in monorail 1 and restrictor-freezer coil 3. The product, under pressure of 1700 p. s. i. and at a temperature of approximately 175° C. flows through the outlet line 2 and restrictor-freezer coil 3 into capsule 4.

During the above operation, water at a temperature below the freezing point of the product is permitted to circulate through the jacket of freezer coil 7 to prevent an uncontrollable through-flow of product into main receiver 13.

Since it is advantageous to operate the hot wall of the diffusion columns at a temperature above the critical temperature of the product, a quantity of product substantially equal to the capacity of the capsule may be bled into said capsule without producing a severe pressure drop in the column. In the case in question, a pressure drop of approximately 175 p. s. i. occurred in the columns each time a capsule of 150 cc. capacity was filled.

When the capsule is filled, the product in the restrictor-freezer coil 3 is frozen and the bottom monorail is unfrozen in order that circulation of feed may be resumed.

Simultaneous with the unfreezing of the bottom monorail, freezer coil 7 is unfrozen by purging the water from the jacket of said coil with air from line 8 and causing the product in the capsule to flow through helix 11 and interconnected lines into main receiver 13. By means of steam line 5, the capsule is maintained at a temperature of approximately 130° C., thus producing a flow of product from the capsule into the main receiver due to the vapor pressure of said product.

Since the rate of flow of product from the columns into the capsule is a function of the temperature of the capsule, it is advantageous to maintain the capsule at a temperature which will facilitate the filling of said capsule in a relatively short time. When the capsule was maintained at a temperature of 130° C. the capsule was filled in 40 to 60 seconds.

The capsule is angularly disposed, the upstream being elevated to facilitate transfer of product under its own vapor pressure to the main receiver.

The main receiver 13 has a capacity several times greater than capsule 4, and is mounted vertically in a heated cylindrical duct, said duct being heated by steam or other suitable means. Advantageous results are obtained when duct 14 is maintained at a temperature of 65° C.

The entire vertical-duct-main receiver assembly is positioned on a weighing scale 15, and helix 11 permits a tension-free scale reading.

When the contents of capsule 4 has been transferred into the main receiver, which fact is determined by the increase in weight registered by the scales, freezer coil 7 is again frozen and the entire foregoing process is repeated.

The admission of water or air into the freeze-off lines 8, 10 and 17 is controlled by solenoid valves 18 which are of the conventional types and are remotely operated by means of time-cycle control apparatus.

When the main receiver 13 has been filled as shown by a given change of weight on the weighing scale, the product being transferred is frozen on both sides of the compression fitting 19 by means of a refrigerant, such as Dry Ice, which is packed around the tie-in line 12. The connection is then broken and the main receiver is removed from the vertical duct and replaced by an empty receiver.

The refrigerant is then removed from around the tie-in line, and heat absorbed from the adjacent steam line 5 reopens the line and the main receiver is again ready to receive product.

*Example II*

In accordance with this example, the operation of our invention is similar to that described in Example I with the following exceptions:

The product in the columns is maintained at a pressure between 1700 p. s. i. to 2000 p. s. i., capsule 4 is maintained at a temperature between 130° C. to 170° C. and main receiver 13 is maintained at a temperature between 65 to 80° C.

*Example III*

In accordance with this example, the operation of our invention is similar to that described in Example I with the following exceptions:

The product in the columns is maintained at a pressure between 1500 to 1700 p. s. i., capsule 4 is maintained at a temperature between 100 to 130° C. and main receiver 13 is maintained at a temperature between 45 to 65° C.

It is to be understood that other forms of apparatus may be utilized in the practice of our invention, and that these methods are not limited in their operation to the apparatus described above.

It is also to be understood that the apparatus of our invention is not restricted in its use with liquid thermal diffusion columns, but may be used with any form of apparatus which separates gases of different molecular species in the liquid phase.

It is to be noted from the preceding description that the bottom monorail and the regular freezer coil 7 are frozen and unfrozen simultaneously. Meanwhile, the top monorail and the restrictor-freezer coil are unfrozen and frozen simultaneously to prevent circulation during product removal and also to prevent the uncontrolled flow of product to the main receiver.

During preferred operation, the product in the column is under a pressure of 1700 p. s. i. and the vapor pressure of the liquid in the capsule at a temperature of 130° C. is approximately 120 p. s. i. After the material in the capsule has been transferred to the main receiver, the pressure in the capsule is approximately 22 p. s. i., or equal to the vapor pressure of the product in the main receiver at a temperature of 65° C. By controlling the temperature of the capsule between 100° C. and 170° C., and controlling the temperature of the main receiver between 45° C. and 80° C., sufficient pressure differentials exist to transfer the product alternately from column to capsule and capsule to receiver.

It is further to be noted that the restrictor coil provides for a reduction in pressure of the material entering the capsule in order to prevent a sudden surge of material into the capsule which would give rise to a pressure drop greater than 200 p. s. i., or sufficient to cause pitching.

Restrictor action of such magnitude is desired as to give a predetermined rate of flow without causing excessive pressure drop in the column.

Results similar to the above-described pressure-reduction control can be obtained by use of an orifice. However, since it is desired to employ a freeze-off method of valving, the combination restrictor-freezer coil is more practical.

The temperatures and pressures referred to in the above description are particularly advantageous when the process material is $UF_6$ and are included for the purpose of clearly illustrating the method of operation. However, the use of $UF_6$ is not a limitation on our invention, since the thermal diffusion product of other than uranium compounds, for example, hydrogen chloride or methane, may be withdrawn by the method herein described.

It will be seen, therefore, that this invention provides an apparatus and method for removing the product from liquid thermal diffusion columns in limited quantities and at a rate which prevents excessive pressure drop in the column which would otherwise have a detrimental effect on the product.

It will be obvious to those skilled in the art that various changes may be made in this apparatus without departing from the spirit of the invention, and therefore the invention herein described is not limited to what is shown in the drawing and described in the specification, but only as indicated by the following claims.

We claim:

1. A process for removing light product from a thermal diffusion separation system comprising a plurality of parallel-connected thermal diffusion columns, which comprises preventing inter-column flow at the bottom of said columns while transferring a minor fraction of the light product from the top of said columns, by constricted flow, to an intermediate receiver, and thereafter preventing inter-column flow at the top of said columns, and preventing flow to said intermediate receiver, while transferring said withdrawn fraction of light product from said intermediate receiver to a final receiver.

2. A process for removing light product from a uranium hexafluoride thermal diffusion system comprising a plurality of parallel-connected thermal diffusion columns containing liquid uranium hexafluoride, which comprises maintaining the pressure in said columns within the range 1500–2000 lbs. per sq. in., preventing inter-column flow at the bottom of said columns while transferring a minor fraction of the light product from the top of said colums, under sufficiently constricted flow to prevent a pressure drop in said columns in excess to 200 lbs. per sq. in., to an intermediate receiver maintained at a temperature within the range 100–170° C., and thereafter preventing inter-column flow at the top of said columns, and preventing flow to said intermediate receiver, while transferring said withdrawn fraction of light product, by means of its vapor pressure, from said intermediate receiver to a final receiver maintained at a temperature within the range 45–80° C.

3. The process of claim 2 in which the pressure in the columns is maintained within the range 1500–1700 lbs. per sq. in., the intermediate receiver is maintained at a temperature within the range 100–130° C., and the final receiver is maintained at a temperature within the range 45–60° C.

4. The process of claim 2 in which the pressure in the columns is maintained within the range 1700–2000 lbs. per sq. in., the intermediate receiver is maintained at a temperature within the range 130–170° C., and the final receiver is maintained at a temperature within the range 65–80° C.

5. The process of claim 2 in which the pressure in the columns is maintained at about 1700 lbs. per sq. in., the intermediate receiver is maintained at a temperature of about 130° C., and the final receiver is maintained at a temperature of about 65° C.

References Cited in the file of this patent

UNITED STATES PATENTS 2,268,134   Clusius _____ Dec. 30, 1941